US010073943B2

United States Patent
Kalashnikov et al.

(10) Patent No.: US 10,073,943 B2
(45) Date of Patent: Sep. 11, 2018

(54) GATE LENGTH UPSIZING FOR LOW LEAKAGE STANDARD CELLS

(71) Applicant: FREESCALE SEMICONDUCTOR, INC., Austin, TX (US)

(72) Inventors: Viacheslav Kalashnikov, Zelenograd (RU); Denis Malashevich, Zelenograd (RU); Mikhail Semenov, Zelenograd (RU)

(73) Assignee: NXP USA, Inc., Austin, TX (US)

( * ) Notice: Subject to any disclaimer, the term of this patent is extended or adjusted under 35 U.S.C. 154(b) by 83 days.

(21) Appl. No.: 15/088,210

(22) Filed: Apr. 1, 2016

(65) Prior Publication Data

US 2017/0091372 A1    Mar. 30, 2017

(30) Foreign Application Priority Data

Sep. 25, 2015  (RU) .................... 2015140932

(51) Int. Cl.
*G06F 17/50* (2006.01)

(52) U.S. Cl.
CPC ...... *G06F 17/5081* (2013.01); *G06F 17/5072* (2013.01); *G06F 17/5077* (2013.01); *G06F 2217/02* (2013.01); *G06F 2217/08* (2013.01)

(58) Field of Classification Search
CPC .............. G06F 17/5072; G06F 17/5077; G06F 17/5081; G06F 2217/78; G06F 2217/84; G06F 2217/08
USPC ................... 716/133, 134, 135, 122
See application file for complete search history.

(56) References Cited

U.S. PATENT DOCUMENTS

| 5,057,898 A * | 10/1991 | Adan ................. H01L 21/8221 257/369 |
| 5,959,487 A * | 9/1999 | Kawamura ............ H03K 5/131 327/270 |
| 6,369,412 B1 * | 4/2002 | Ueda ................. H01L 27/0207 257/206 |
| 7,441,211 B1 | 10/2008 | Gupta et al. |
| 7,932,542 B2 | 4/2011 | Berthold et al. |

(Continued)

FOREIGN PATENT DOCUMENTS

EP    2355153 B1    5/2012

OTHER PUBLICATIONS

Gupta, Puneet et al., "Gate-Length Biasing for Runtime-Leakage Control", IEEE Transactions on Computer-Aided Design of Integrated Circuits and Systems, vol. 25, No. 8, Aug. 2006, pp. 1475-1485.

(Continued)

*Primary Examiner* — Phallaka Kik (57) ABSTRACT

This disclosure describes a library optimization system that creates modified standard cells with reduced leakage currents that meet predefined cell area, timing, and leakage requirements. The library optimization system selects transistors to upsize based upon the fact that transistors of a same type, such as p-channel or n-channel transistors, that are connected in series produce a small reverse bias between the gate and source, known as a stacking effect. The stacking effect results in an inherent decrease in leakage current for the series-connected transistor chain. As such, the library optimization system adjusts gate lengths of transistors that are not part of the transistor series chains having a relatively large amount of same type transistors.

10 Claims, 10 Drawing Sheets

(56) References Cited

U.S. PATENT DOCUMENTS

| | | | |
|---|---|---|---|
| 8,176,445 B1 | 5/2012 | Qian | |
| 8,458,638 B2 | 6/2013 | Menut et al. | |
| 8,612,915 B1 | 12/2013 | Sundareswaran et al. | |
| 8,927,361 B2* | 1/2015 | Booth, Jr. | H01L 21/823412 257/369 |
| 2004/0080016 A1 | 4/2004 | Houston | |
| 2004/0083440 A1 | 4/2004 | Houston | |
| 2004/0243946 A1 | 12/2004 | Gandhi | |
| 2005/0072988 A1* | 4/2005 | Augusto | H01L 21/82388 257/192 |
| 2005/0270078 A1* | 12/2005 | Santou | G06F 17/505 327/276 |
| 2007/0089077 A1 | 4/2007 | Sumikawa | |
| 2008/0099857 A1* | 5/2008 | Furuta | H01L 21/823425 257/401 |
| 2008/0186059 A1 | 8/2008 | Nozoe | |
| 2008/0253172 A1* | 10/2008 | Yamagami | G11C 8/08 365/154 |
| 2008/0283871 A1 | 11/2008 | Hamada | |
| 2008/0296628 A1 | 12/2008 | Kaneko | |
| 2010/0169846 A1 | 7/2010 | Gupta et al. | |
| 2010/0169847 A1 | 7/2010 | Gupta et al. | |
| 2010/0213979 A1* | 8/2010 | Nishiwaki | H03K 19/20 326/68 |
| 2011/0179391 A1 | 10/2011 | Arimoto | |
| 2011/0252391 A1 | 10/2011 | Arimoto | |
| 2011/0298010 A1 | 12/2011 | Menut et al. | |
| 2012/0042292 A1* | 2/2012 | Abouzeid | G06F 17/505 716/104 |
| 2012/0074985 A1* | 3/2012 | Kimura | H03K 3/356121 326/103 |
| 2012/0126333 A1* | 5/2012 | Thomas | H01L 21/84 257/369 |
| 2013/0069691 A1 | 3/2013 | Sundareswaran | |
| 2014/0028348 A1* | 1/2014 | Andreev | H03K 19/0948 326/41 |
| 2014/0042505 A1* | 2/2014 | Benjamin | H01L 29/78 257/288 |
| 2015/0365013 A1* | 12/2015 | Hameed | H02M 7/25 363/126 |
| 2016/0204107 A1* | 7/2016 | Shimbo | H01L 21/823431 326/102 |
| 2016/0211839 A1* | 7/2016 | Koike | H03K 17/122 |

OTHER PUBLICATIONS

Non-Final Office Action dated Mar. 27, 2013 for U.S. Appl. No. 13/606,858, 9 pages.

Notice of Allowance dated Aug. 19, 2013 for U.S. Appl. No. 13/606,858, 8 pages.

Non-Final Office Action dated Nov. 21, 2012 for U.S. Appl. No. 13/233,393, 8 pages.

Non-Final Office Action dated May 10, 2013 for U.S. Appl. No. 13/233,393, 8 pages.

Notice of Allowance dated Sep. 5, 2013 for U.S. Appl. No. 13/233,393, 6 pages.

* cited by examiner

GATE LENGTH UPSIZING FOR LOW LEAKAGE STANDARD CELLS

TECHNICAL FIELD

The present disclosure relates to selecting particular transistors within a standard cell for which to upsize based upon transistor series chain properties within the standard cell.

BACKGROUND

Power consumed by leakage currents in system on a chip (SoC) ASIC designs has become a large portion of the overall power budget of the SoC designs. One approach to reduce an SoC's leakage current is to vary the gate length of transistors in standard cells that are utilized to create the SoC due to the fact that an exponential relationship exists between a standard cell's source-drain leakage and its gate length.

Standard cell libraries typically include low leakage cells (LOLK) for a circuit designer to utilize in a circuit design. Every transistor in a low leakage cell has an increased gate length to provide a substantial decrease in leakage current, referred to as "upsized" transistors. However, these low leakage cells are typically 10-15 percent larger than the default standard cell because of the larger gate lengths throughout the cell, and are typically slower than the default standard cell because of the substantial decrease in leakage current. As such, a circuit designer is required to evaluate tradeoffs between using default standard cells that are smaller, faster, but have high leakage current versus low leakage cells that have low leakage current but are larger and slower.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

A library optimization system is provided that creates modified standard cells with reduced leakage currents and meet predefined design area and timing requirements. The library optimization system selects transistors to upsize based upon first identifying transistors of a same type that are connected in series, such as p-channel or n-channel transistors. These "stacked" transistors produce a small reverse bias between their gate and source, which results in an inherent decrease in leakage current for the series-connected transistor chain. As such, the library optimization system adjusts only gate lengths of transistors that are not part of transistor series chains that have a relatively large amount of same type transistors.

The library optimization system determines a largest amount of same-type transistors in a standard cell that are connected in series and then selects transistors in the standard cell that are not part of the largest transistor series chains. The library optimization system increases the gate length of each of the selected transistors to create a modified standard cell and places the modified standard cell through a series of measurements to determine if the modified standard cell meets predetermined design requirements, such as leakage current requirements, area requirements, and timing requirements.

When the modified standard cell meets each of the predetermined design requirements, the library optimization system adds the modified standard cell to a standard cell library, which a circuit designer may subsequently utilize to generate an integrated circuit design. When the modified standard cell does not meet each of the predetermined design requirements, the library optimization system adjusts the number of transistors for which to increase their gate lengths until each of the design requirements are met.

Figure 1:
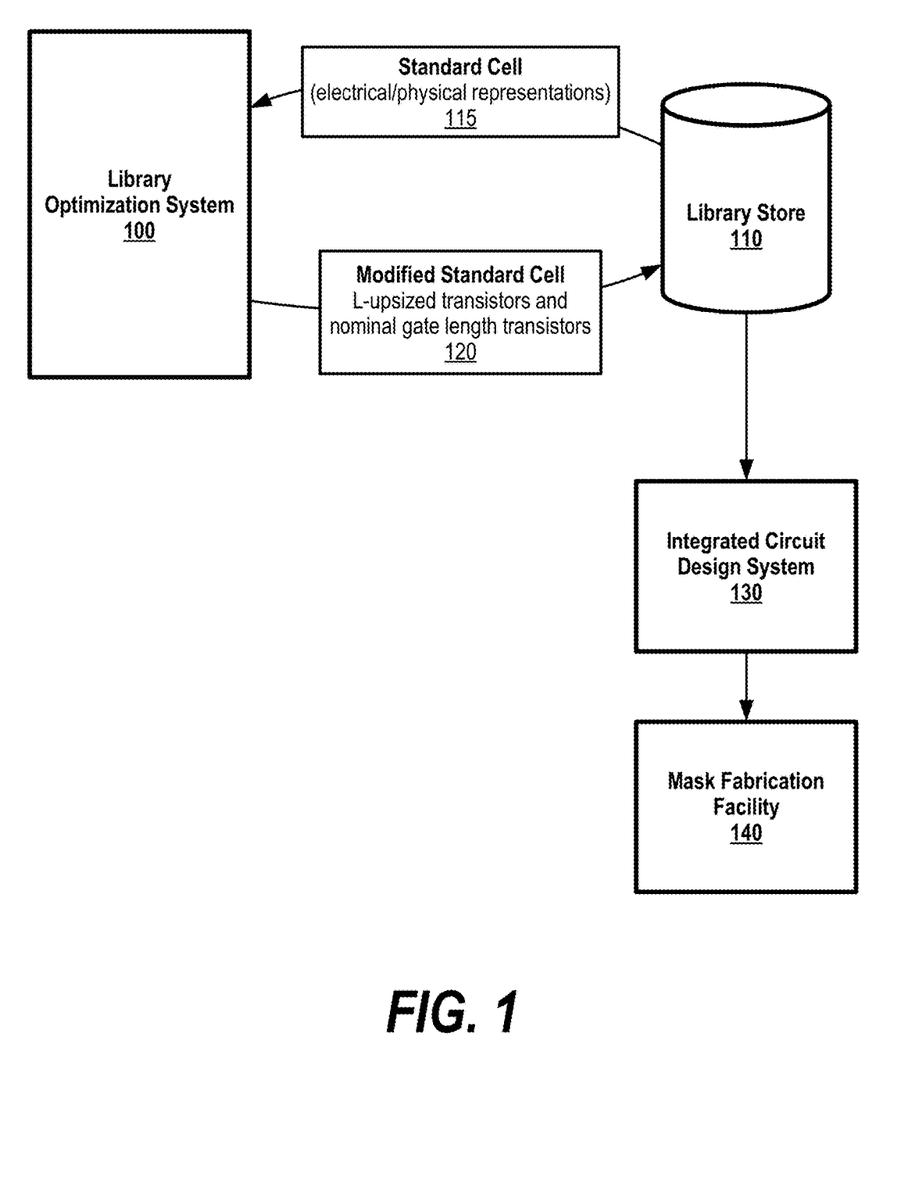
FIG. 1 is a diagram depicting one example of a library optimization system that generates modified standard cells and an integrated circuit design system that creates an integrated circuit design using the modified standard cells.

FIG. 1 is a diagram depicting one example of a library optimization system that generates modified standard cells and an integrated circuit design system that creates an integrated circuit design using the modified standard cells. Library optimization system 100 retrieves standard cell 115 from a standard cell library in library store 110. Standard cell 115 may represent a digital logic function, such as a sequential or logic element, and includes information corresponding to electrical and physical properties of the digital logic function, such as schematic netlist information and GDSII layout information.

Library optimization system 100 determines a largest amount of same-type transistors in standard cell 115 that are connected in series, such as three p-channel or n-channel transistors connected in series. Then, library optimization system 100 sets a "stack number" variable equal to the determined amount of transistors connected in series. Library optimization system 100 then identifies transistors in standard cell 115 that are not part of a transistor series chain having the stack number of same type transistors, and increases their gate lengths accordingly to create a modified standard cell. See FIG. 5 and corresponding text for further details.

Library optimization system 100 performs measurements on the modified standard cell to determine whether the modified standard cell meets predetermined design requirements. For example, library optimization system 100 may perform initial layout migration and synthesis of the modified standard cell to determine whether the modified standard cell meets leakage current requirements, area requirements, and timing requirements.

When the modified standard cell meets each of the predetermined design requirements, library optimization system 100 stores the modified standard cell as modified standard cell 120 in library store 110 for subsequent use by a circuit designer discussed below. When the modified standard cell does not meet each of the predetermined design requirements, library optimization system 100 decrements the stack number variable and adjusts the number of transistors for which to increase their gate lengths accordingly until each of the design requirements are met. See FIGS. 2 through 9 and corresponding text for further details.

Once modified standard cell 120 is stored in library store 110, a circuit designer may design an integrated circuit that includes instances of modified standard cell 120 using integrated circuit design system 130. Integrated circuit design system 130 may include functions that perform behavior design, RTL design, logic synthesis, layout, etc., to create mask layer data that includes information necessary to create wafer masks for production of an integrated circuit. Mask fabrication facility 140 receives the mask layer data and creates masks from the mask layer data that, in turn, a semiconductor facility uses to create an integrated circuit on a semiconductor wafer.

In one embodiment, library optimization system 100 and integrated circuit design system 130 are subsystems in a centralized computer system or distributed computer system. Library optimization system 100 and integrated circuit design system 130 may be software based, hardware based, or a combination of software components and hardware components.

Figure 2:
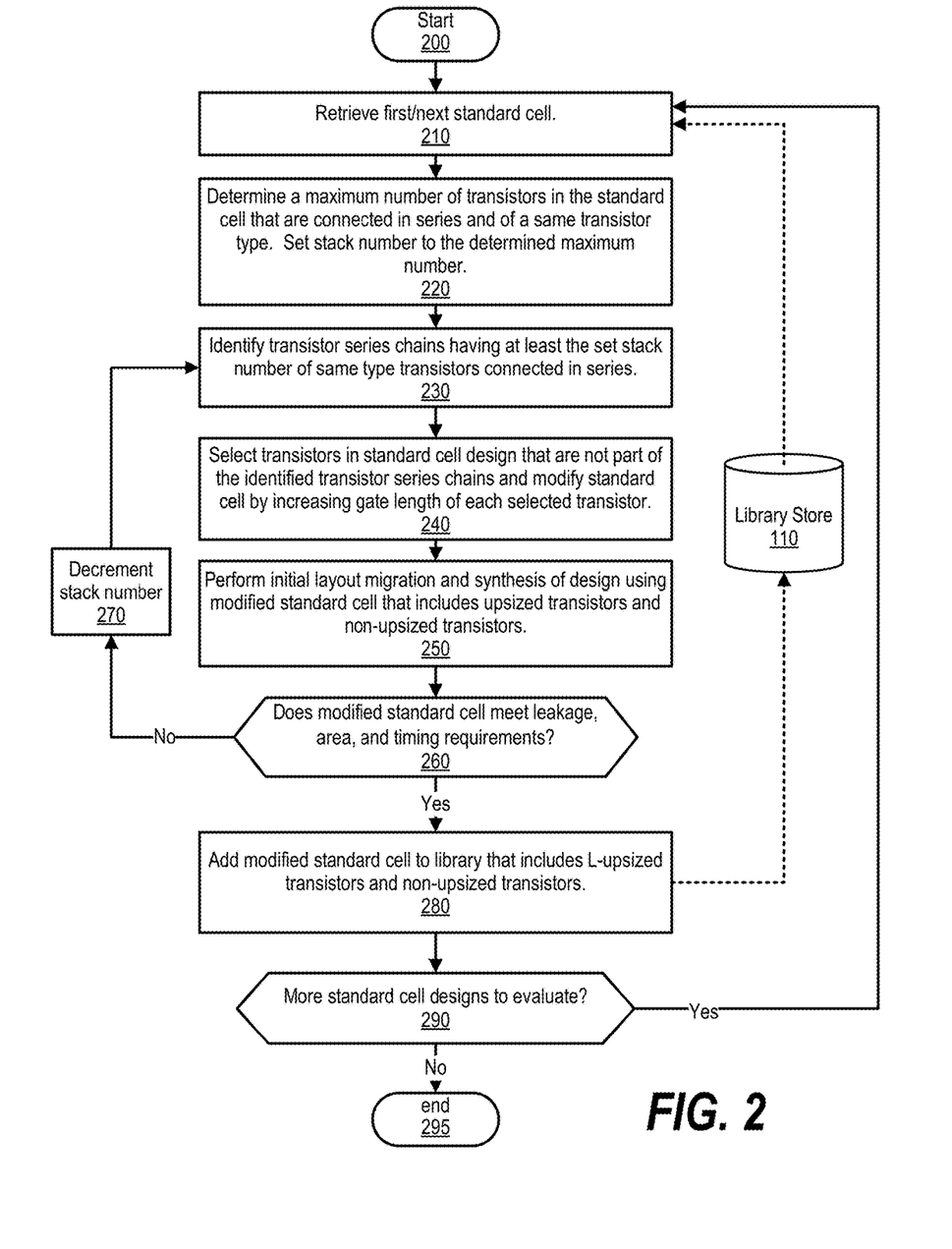
FIG. 2 is a flowchart depicting one example of steps taken by a library optimization system to increase gate lengths of selective transistors in a standard cell to meet predetermined design requirements.

FIG. 2 is a flowchart depicting one example of steps taken by a library optimization system to increase gate lengths of selective transistors in a standard cell to meet predetermined design requirements. FIG. 2 processing commences at 200, whereupon the process selects a first standard cell from library store 110 at 210. In one embodiment, the process retrieves electrical circuit representations, such as a schematic represented in a netlist, and a physical representation such as a GDSII layout.

Figure 4:
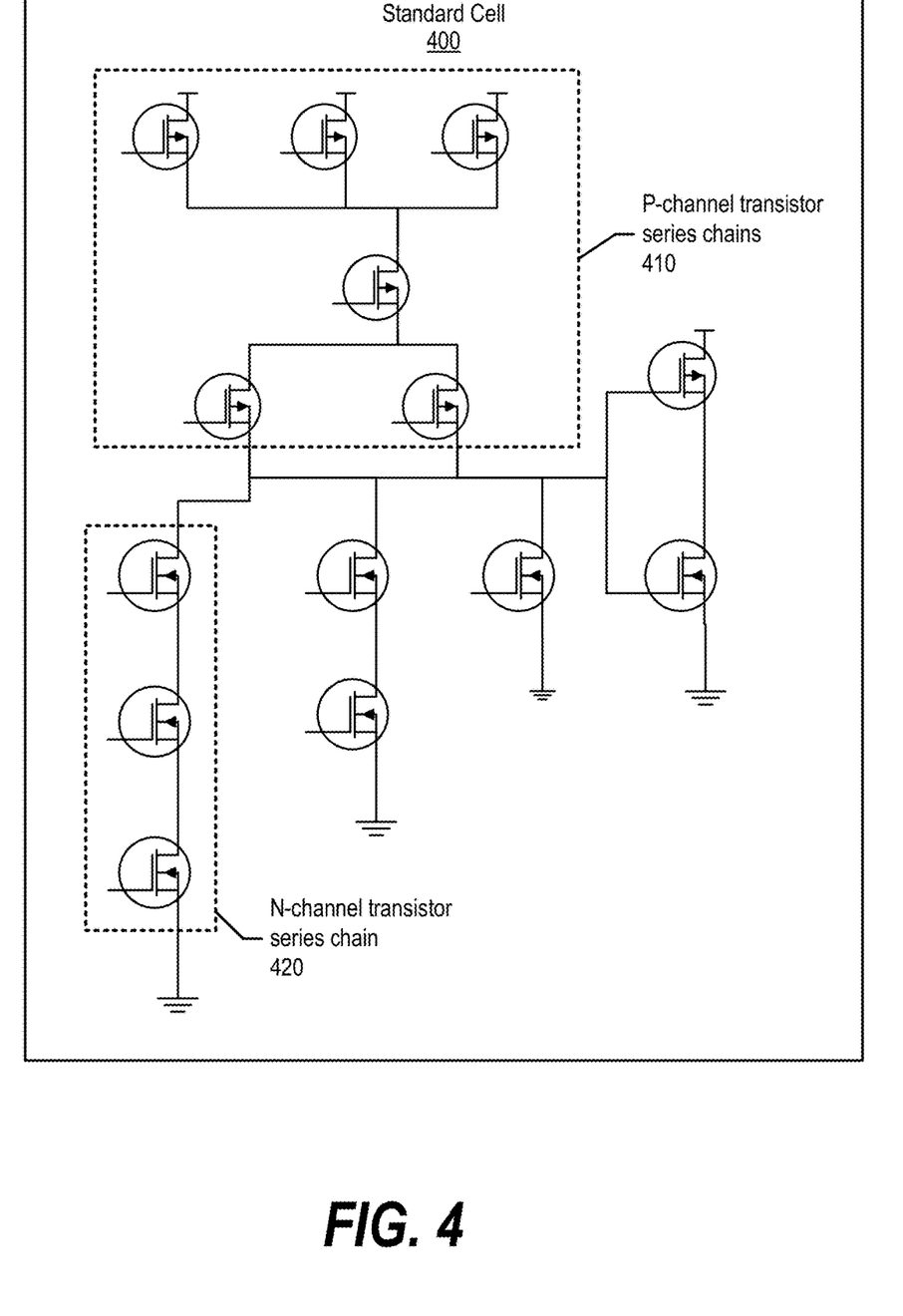
FIG. 4 is a diagram depicting one example of a standard cell that identifies transistor series chains having a maximum amount of same type transistors in series.

At 220, the process determines a maximum number of transistors in the selected standard cell that are of a same type and connected in series. Referring to FIG. 4, as an example, the process determines that three transistors are the maximum number of same type transistors connected in series based upon n-channel transistor series chain 420 and p-channel transistor series chains 410. The process sets a "stack number" variable to the determined maximum number, such as three.

At 230, the process identifies transistor series chains that have a number of transistors equaling the stack number. For example, if the process sets the stack number to three, the process identifies each transistor series chain that has three same type transistors connected in series. As discussed below, if the process is required to decrement the stack number due to not meeting one or more design requirements, the process, at 230, selects transistor series chains having at least the set stack number of transistors. For example, if the stack number is decremented to two, the process selects transistor series chains that have two or three same type transistors. See FIG. 6 and corresponding text for further details.

At 240, the process selects transistors in the standard cell that are not part of one of the identified transistor series chains from 230, such as transistors that are not connected in series to a same type transistor, or transistors that are part of transistor series chains but with a lesser amount of same type transistors than the stack number. The process then modifies the standard cell by increasing, or upsizing, the gate length of each of the selected transistors to decrease their leakage current. For example, the process may have an objective to reduce the leakage current as much as possible. In this example, the process upsizes transistors at 5-10% as a first iteration and then analyzes the results. If all of the identified transistors are upsized and there is no area penalty, the process may attempt to upsize the identified transistors more, such as 15%, 20%, etc. until the process detects an area penalty.

At 250, the process performs an initial layout migration and synthesis of the modified standard cell using the upsized transistors and the non-upsized transistors. The process determines as to whether the initial layout and migration meets the standard cell design's design requirements, such as leakage current requirements, area requirements, and timing requirements (decision 260). If the modified standard cell does not meet the design requirements, then decision 260 branches to the 'no' branch which loops back to decrement the stack number at 270, such as decrementing three to two. By decrementing the stack number, a lesser amount of transistors are selected at 240 to increase their gate length. For example, when the stack number is set to three, the process may upsize too many transistors that the overall standard cell footprint becomes too large or the standard cell's timing is too slow. As such, the process decrements the stack number to reduce the overall footprint or to speed up timing while still reducing leakage current relative to the default standard cell. See FIGS. 6, 9, and corresponding text for further details.

This looping continues until the modified standard cell design meets each of the design requirements, at which point decision 260 branches to the 'yes' branch exiting the loop. At step 280, the process adds the modified standard cell to the standard cell library in library store 110 for subsequent use by a circuit designer to create an integrated circuit.

The process determines as to whether there are more standard cells to evaluate (decision 290). If there are more standard cells to evaluate, then decision 290 branches to the 'yes' branch which loops back to process the next standard cell. This looping continues until there are no more standard cells to evaluate, at which point decision 290 branches to the 'no' branch exiting the loop. FIG. 2 processing thereafter ends at 295.

Figure 3:
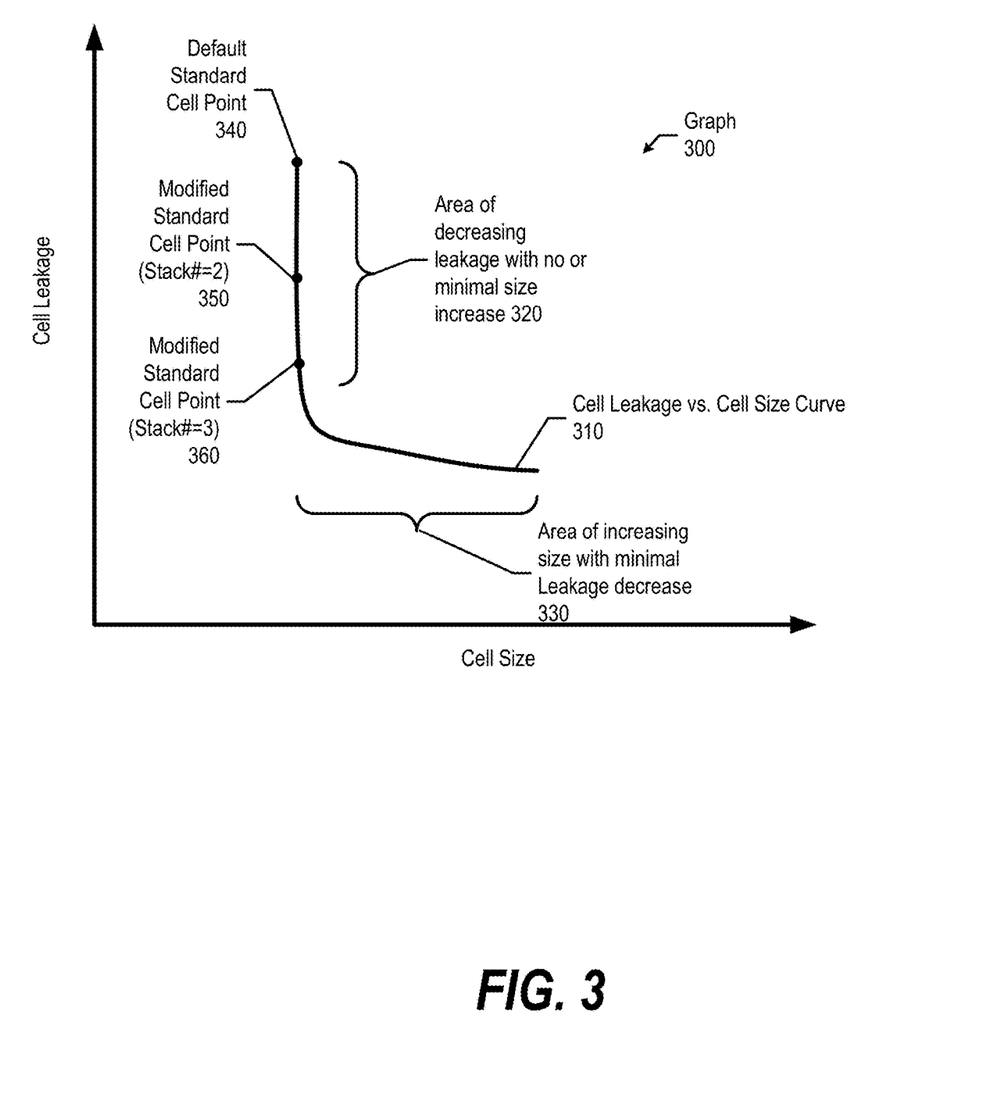
FIG. 3 is a depiction of a graphical representation of cell leakage current relative to cell size of a standard cell.

FIG. 3 is a depiction of a graphical representation of cell leakage current relative to cell size of a standard cell. Curve 310 has two relatively linear sections, which are section 320 and section 330. Section 320 corresponds to cell leakage being substantially reduced with a minimal increase in cell size when select transistors within the standard cell are upsized. Section 330 corresponds to cell leakage being minimally reduced with a substantial increase in cell size, such as when every transistor within the standard cell are upsized Library optimization system 100 operates in section 320 to reduce a standard cell's leakage current with no or minimal size increase. Curve 310 includes points 340, 350, and 360. Point 340 corresponds to a default standard cell with no upsized transistors, which results in high cell leakage and small cell size. Point 350 corresponds to a modified standard cell using a stack number of two. This modified standard cell has decreased cell leakage with no to little cell size increase. See FIGS. 6, 9, and corresponding text for further details. Point 360 corresponds to a modified standard cell using a stack number of three. This modified standard cell has even more decreased cell leakage with no to little cell size increase. As discussed herein, a modified standard cell may meet area requirements but not be able to meet timing requirements. As such, library optimization system 100 may need to decrement the stack number, such as from three to two, in order to meet area and timing requirements while also reducing cell leakage.

FIG. 4 is a diagram depicting one example of a standard cell that identifies transistor series chains having a maximum amount of same type transistors in series. Library optimization system 100 evaluates standard cell 400 and locates seven transistor series chains that have three transistors. Transistor series chains 410 include six transistor series chains each having three p-channel transistors and transistor series chain 420 includes a transistor series chain having three n-channel transistors. As such, library optimization system 100 sets an initial stack number at three and proceeds to select transistors that are not part of a three transistor series chain. See FIG. 5 and corresponding text for further details.

Figure 5:
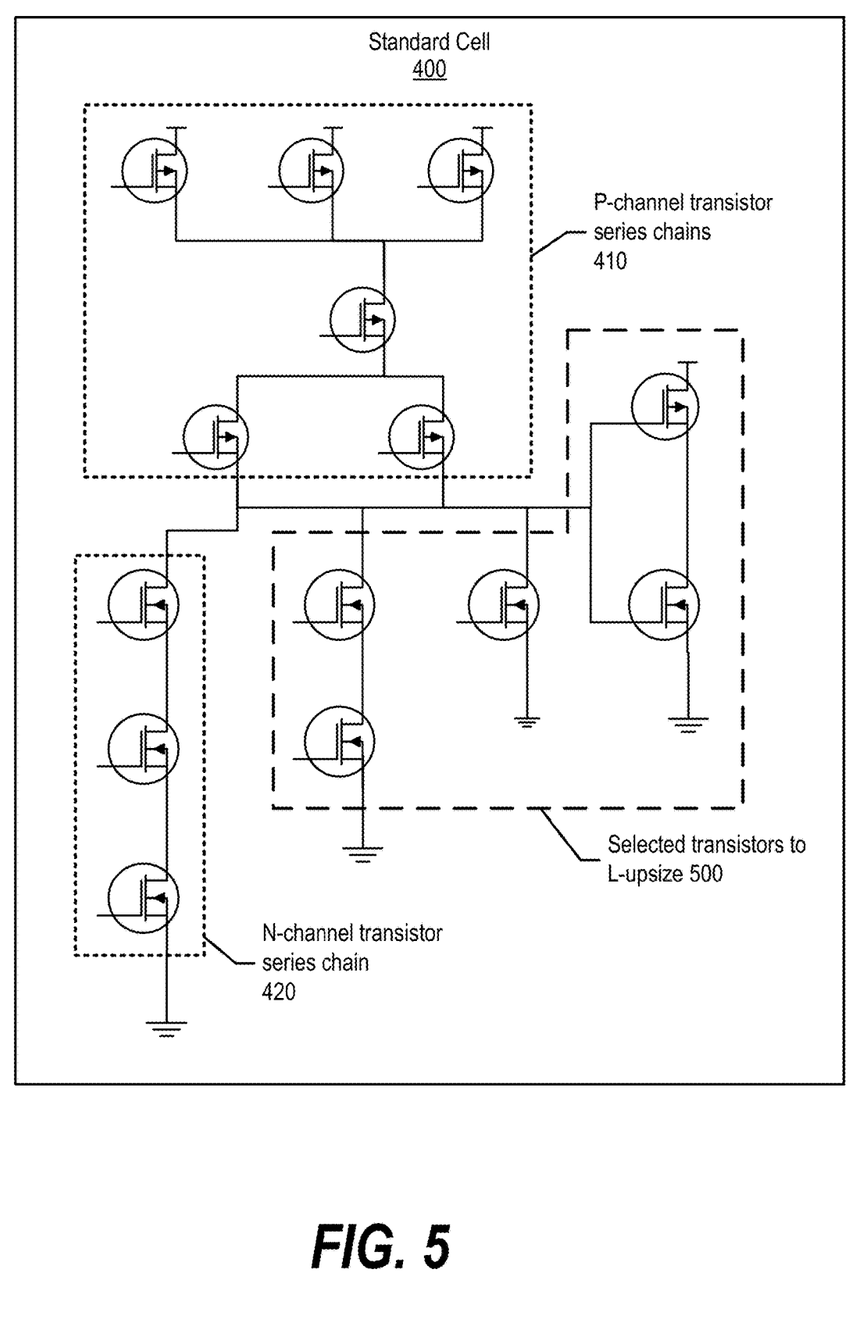
FIG. 5 is a diagram depicting one example of a standard cell that outlines five transistors for which to upsize that are not part of identified transistor series chains having the maximum amount of same type transistors in series.
Figure 8:
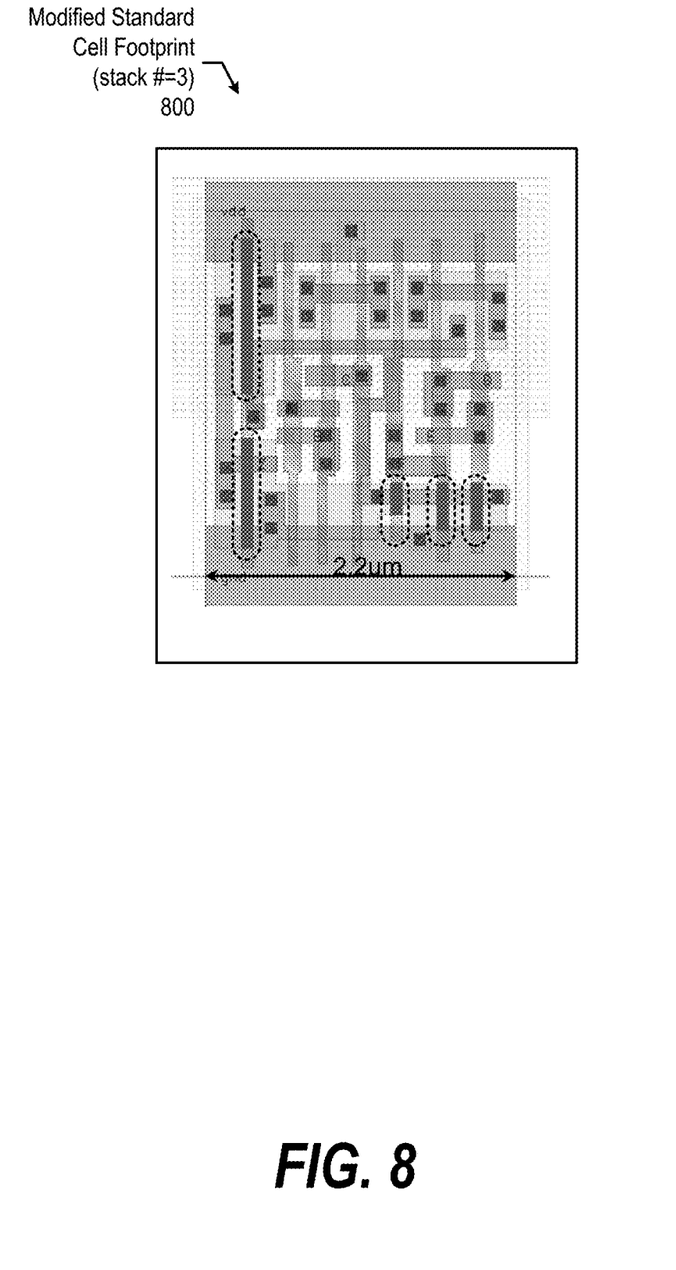
FIG. 8 is a diagram depicting a footprint of a modified standard cell that includes five upsized transistors corresponding to those outlined in FIG. 5.

FIG. 5 is a diagram depicting one example of a standard cell that outlines five transistors for which to upsize that are not part of identified transistor series chains having the maximum amount of same type transistors in series. Continuing from FIG. 4, library optimization system 100 previously set the stack number at three based on series chains 410 and 420. In turn, library optimization system 100 selects those transistors that are not part of a three-transistor series chain, which are transistors 500. In turn, library optimization system 100 upsizes each of transistors 500 and evaluates standard cell 400 against predetermined design requirements. FIG. 8 shows an example of a footprint area with the five transistors 500 being upsized.

If the footprint of standard cell 400 as modified results in too large of an area, or if the timing of standard cell 400 as modified does not meet timing requirements, library optimization system 100 reduces the stack number that, in turn, reduces the number of transistors that are upsized. See FIGS. 6, 9, and corresponding text for further details.

Figure 6:
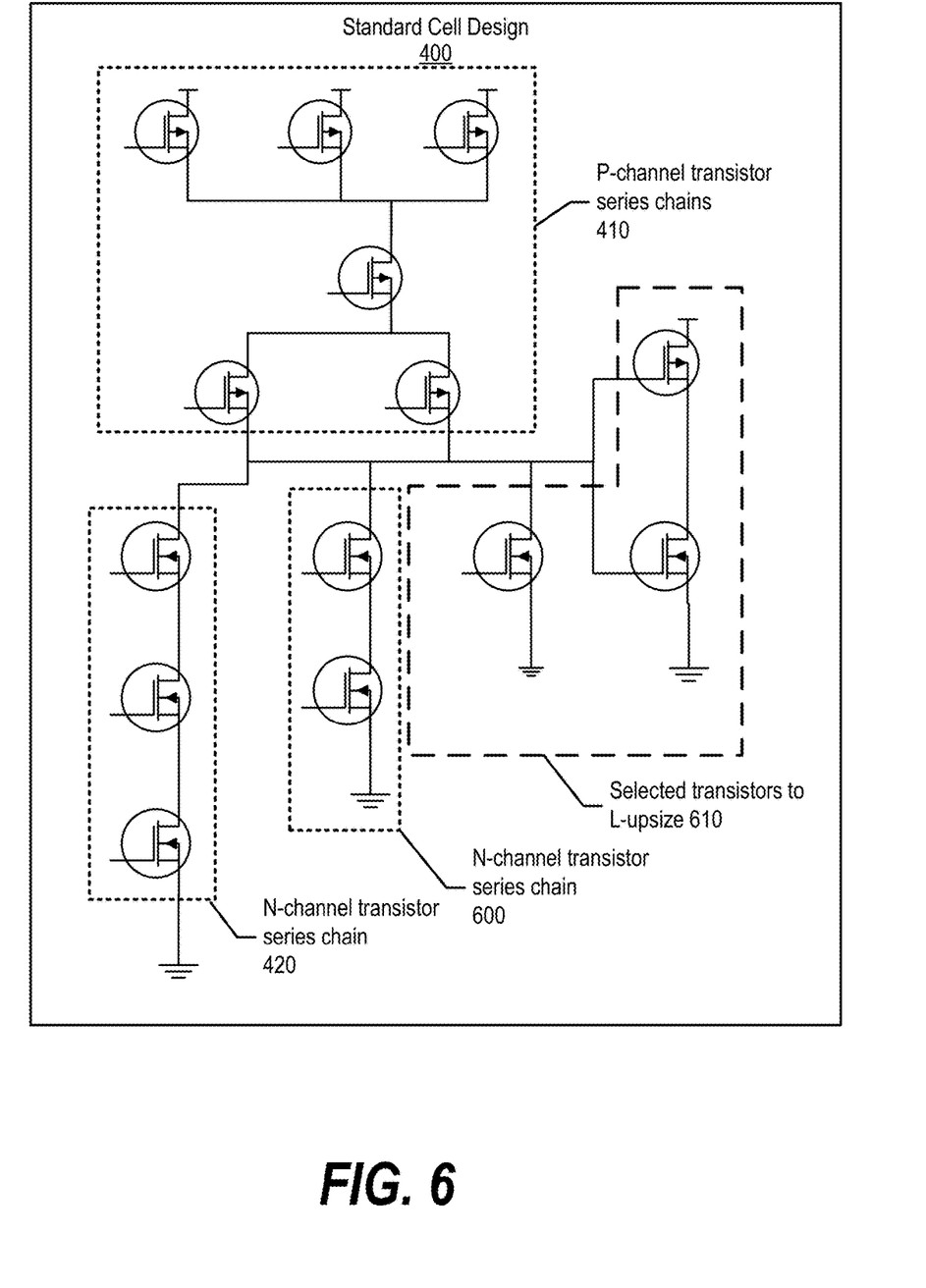
FIG. 6 is a diagram depicting one example of a standard cell that outlines three transistors for which to upsize that are not part of a two-transistor series chain or a three-transistor series chain.

FIG. 6 is a diagram depicting one example of a standard cell that outlines three transistors for which to upsize that are not part of a two-transistor series chain or a three-transistor series chain. Continuing from FIG. 5, when the modified standard cell does not meet one or more design requirements, such as an area design requirement or a timing design requirement, library optimization system 100 decrements the stack number to reduce the overall number of transistors to upsize. FIG. 6 shows that when the stack number is two, library optimization system 100 omits transistor series chain 600 from being upsized because transistor series chain 600 includes two n-channel transistors connected in series. Series chain 410 and 420 are still omitted because they have three same type transistors, which is larger than the stack number of two.

Figure 9:
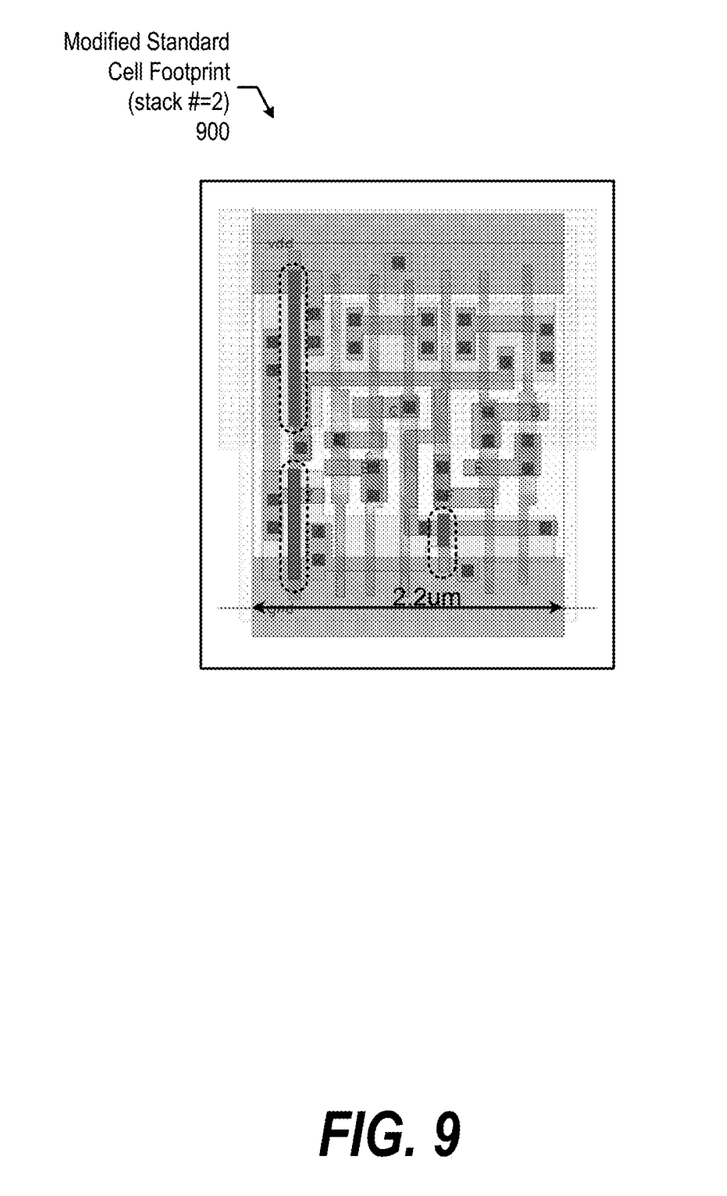
FIG. 9 is a diagram depicting a footprint of a modified standard cell that includes three upsized transistors corresponding to those outlined in FIG. 6.

As such, library optimization system 100 selects three transistors to upsize, which are transistors 610. Library optimization system 100 then evaluates standard cell 400 as modified to determine if the modified standard cell meets the design requirements. FIG. 9 shows an example of a footprint area with the upsized transistors 610 being upsized.

Figure 7:
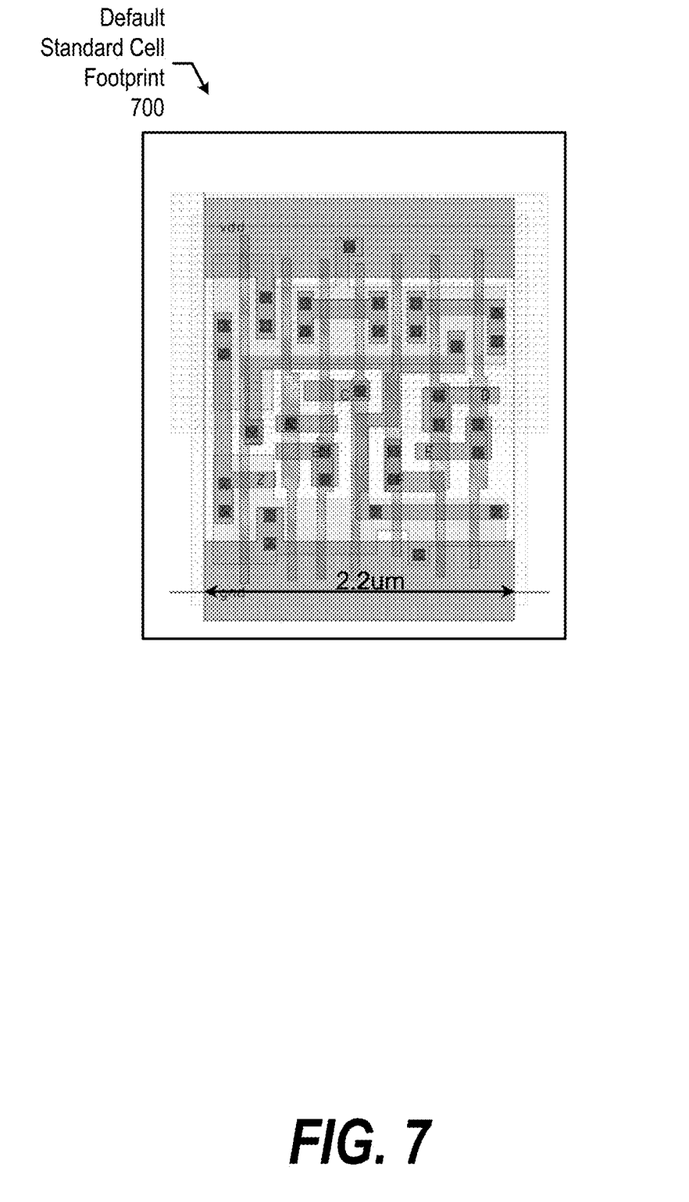
FIG. 7 is a diagram depicting a footprint of a default standard cell.

FIG. 7 is a diagram depicting a footprint of a default standard cell. Footprint 700 is 2.2 um wide and includes transistors that each have a gate length of 60 nm, for example. When library optimization system 100 sets the stack number to three and upsizes five transistors as shown in FIG. 5, library optimization system 100 generates footprint 800 shown in FIG. 8.

FIG. 8 is a diagram depicting a footprint of a modified standard cell that includes five upsized transistors corresponding to those outlined in FIG. 5. As shown in FIG. 5, when the stack number is three, five transistors are selected to be upsized, which are transistors 500. FIG. 8 shows dashed lines around the five transistors whose gate lengths were upsized from 60 nm to 80 nm. The example in FIG. 8 shows that footprint 800 remains the same size of 2.2 um after the upsizing relative to footprint 700 in FIG. 7. If the footprint grew to 2.4 um or 2.6 um, the modified standard cell may not meet area design requirements and library optimization system 100 would decrement the stack number to reduce the number of transistors for which to upsize in order to reduce the size of the footprint. Likewise, if the modified standard cell does not meet timing requirements due to the five upsized transistors, library optimization system 100 may decrement the stack number to decrease timing delay through the standard cell. See FIG. 9 and corresponding text for further details.

FIG. 9 is a diagram depicting a footprint of a modified standard cell that includes three upsized transistors corresponding to those outlined in FIG. 6. As shown in FIG. 6, when the stack number is two, three transistors are selected to be upsized, which are transistors 610. FIG. 9 shows dashed lines around the three transistors whose gate lengths were upsized from 60 nm to 80 nm. The example in FIG. 9 shows that footprint 900 remains the same size of 2.2 um after the upsizing relative to footprint 700 in FIG. 7. As such, the modified standard cell meets area design requirements and is more probable in meeting timing requirements due to the lesser amount of upsized transistors relative to footprint 800 shown in FIG. 8.

In one embodiment, the footprint area of a modified standard cell has a minimal size increase and is larger than the footprint area of default standard cell footprint 700, but is less than a footprint area of a standard cell with all upsized transistors. In this embodiment, the modified standard cell may still be beneficial to a designer due to its reduced size relative to the standard cell with all upsized transistors.

In another embodiment, the footprint area of a modified standard cell may have a footprint area the same size as a standard cell with all upsized transistors, but may be beneficial to a designer because of its better timing specifications from smaller and faster transistors at various locations.

According to one embodiment of the present invention, a library optimization system selects a set of first series chains of transistors of a same type that includes a greater number of transistors than any of one or more second series chains of transistors. Each of the first series chains of transistors and the second series chains of transistors are included in a standard cell. The library optimization system creates a modified standard cell from the standard cell by increasing a gate length of one or more of the second series chains of transistors and adds the modified standard cell to a standard cell library. In turn, an integrated circuit design system creates an integrated circuit design using the modified standard cell and generates mask layer data based upon the integrated circuit design. The mask layer data is configured to generate masks for construction of an integrated circuit corresponding to the integrated circuit design.

According to another embodiment of the present invention, the library optimization system determines a largest stack number of the standard cell based upon a largest amount of transistors of the same type that are connected in series. The library optimization system then identifies the set of first series chains of transistors based upon the largest stack number.

According to yet another embodiment of the present invention, when the modified standard cell does not meet one or more design requirements, the library optimization system decrements the largest stack number and selects a lesser amount of transistors in the standard cell that should have their gate lengths increased. The library optimization system increases the gate lengths of the selected transistors and produces a different modified standard cell. In turn, the library optimization system adds the different modified standard cell to the standard cell library based upon determining that the different modified standard cell meets the one or more design requirements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, a software embodiment (including firmware, resident software, micro-code, etc.), including processing circuitry for executing thereof, or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program, in a non-transitory fashion, for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 10:
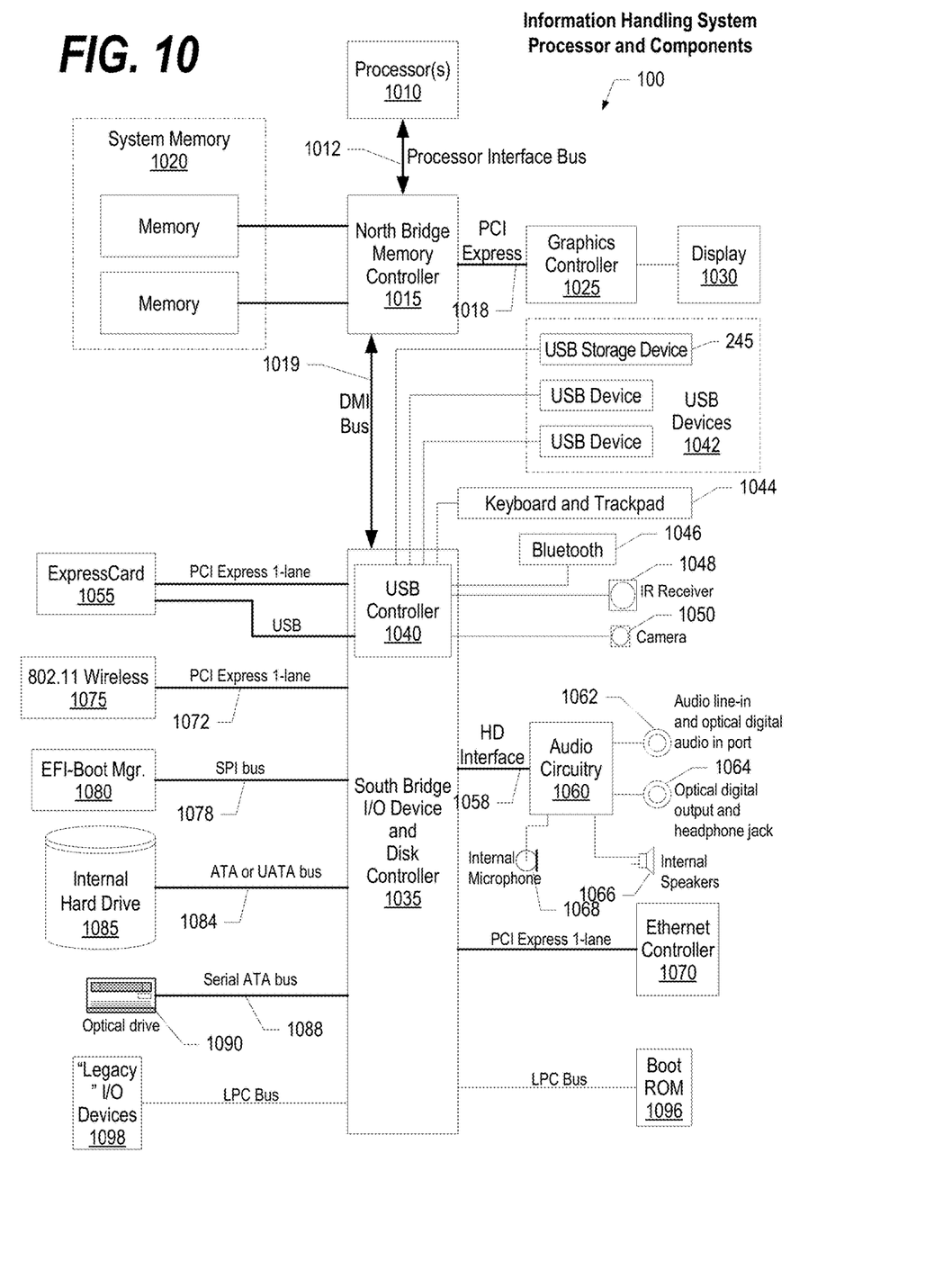
FIG. 10 illustrates an information handling system, which is a simplified example of a computer system capable of performing the computing operations described herein.

FIG. 10 illustrates information handling system 1000, which is a simplified example of a computer system capable of performing the computing operations described herein. Information handling system 1000 includes one or more processors 1010 coupled to processor interface bus 1012.

Processor interface bus 1012 connects processors 1010 to Northbridge 1015, which is also known as the Memory Controller Hub (MCH). Northbridge 1015 connects to system memory 1020 and provides a means for processor(s) 1010 to access the system memory. Graphics controller 1025 also connects to Northbridge 1015. In one embodiment, PCI Express bus 1018 connects Northbridge 1015 to graphics controller 1025. Graphics controller 1025 connects to display device 1030, such as a computer monitor.

Northbridge 1015 and Southbridge 1035 connect to each other using bus 1019. In one embodiment, the bus is a Direct Media Interface (DMI) bus that transfers data at high speeds in each direction between Northbridge 1015 and Southbridge 1035. In another embodiment, a Peripheral Component Interconnect (PCI) bus connects the Northbridge and the Southbridge. Southbridge 1035, also known as the I/O Controller Hub (ICH) is a chip that generally implements capabilities that operate at slower speeds than the capabilities provided by the Northbridge. Southbridge 1035 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 1096 and "legacy" I/O devices (using a "super I/O" chip). The "legacy" I/O devices (1098) can include, for example, serial and parallel ports, keyboard, mouse, and/or a floppy disk controller. The LPC bus also connects Southbridge 1035 to Trusted Platform Module (TPM) 1095. Other components often included in Southbridge 1035 include a Direct Memory Access (DMA) controller, a Programmable Interrupt Controller (PIC), and a storage device controller, which connects Southbridge 1035 to nonvolatile storage device 1085, such as a hard disk drive, using bus 1084.

ExpressCard 1055 is a slot that connects hot-pluggable devices to the information handling system. ExpressCard 1055 supports both PCI Express and USB connectivity as it connects to Southbridge 1035 using both the Universal Serial Bus (USB) the PCI Express bus. Southbridge 1035 includes USB Controller 1040 that provides USB connectivity to devices that connect to the USB. These devices include webcam (camera) 1050, infrared (IR) receiver 1048, keyboard and trackpad 1044, and Bluetooth device 1046, which provides for wireless personal area networks (PANs). USB Controller 1040 also provides USB connectivity to other miscellaneous USB connected devices 1042, such as a mouse, removable nonvolatile storage device 1045, modems, network cards, ISDN connectors, fax, printers, USB hubs, and many other types of USB connected devices. While removable nonvolatile storage device 1045 is shown as a USB-connected device, removable nonvolatile storage device 1045 could be connected using a different interface, such as a Firewire interface, etcetera.

Wireless Local Area Network (LAN) device 1075 connects to Southbridge 1035 via the PCI or PCI Express bus 1072. LAN device 1075 typically implements one of the IEEE 802.11 standards of over-the-air modulation techniques that all use the same protocol to wireless communicate between information handling system 1000 and another computer system or device. Optical storage device 1090 connects to Southbridge 1035 using Serial ATA (SATA) bus 1088. Serial ATA adapters and devices communicate over a high-speed serial link. The Serial ATA bus also connects Southbridge 1035 to other forms of storage devices, such as hard disk drives. Audio circuitry 1060, such as a sound card, connects to Southbridge 1035 via bus 1058. Audio circuitry 1060 also provides functionality such as audio line-in and optical digital audio in port 1062, optical digital output and headphone jack 1064, internal speakers 1066, and internal microphone 1068. Ethernet controller 1070 connects to Southbridge 1035 using a bus, such as the PCI or PCI Express bus. Ethernet controller 1070 connects information handling system 1000 to a computer network, such as a Local Area Network (LAN), the Internet, and other public and private computer networks.

While FIG. 10 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
   selecting one or more first series chains of transistors of a same type, wherein each of the one or more first series chains of transistors comprises a greater number of transistors than any of one or more second series chains of transistors, wherein the one or more first series chains of transistors and the one or more second series chains of transistors are included in a standard cell;
   creating a modified standard cell from the standard cell by increasing a gate length of one or more of the second series chains of transistors;
   adding the modified standard cell to a standard cell library in response to determining that the modified standard cell meets one or more design requirements;
   creating an integrated circuit design that comprises at least one instance of the modified standard cell stored in the standard cell library; and
   generating mask layer data based upon the integrated circuit design, wherein the mask layer data is configured to generate a plurality of masks for construction of an integrated circuit corresponding to the integrated circuit design; and
   forming the plurality of masks for construction of the integrated circuit corresponding to the integrated circuit design.

2. The method of claim 1 further comprising:
   determining a largest stack number of the standard cell, wherein the largest stack number is a largest amount of transistors of the same type that are connected in series in the standard cell; and
   performing the selecting of the one or more first series chains of transistors based upon the largest stack number, wherein each of the one or more first series chains of transistors comprises an amount of transistors equal to the largest stack number.

3. The method of claim 2 wherein, in response to determining that the modified standard cell does not meet at least one of the one or more design requirements, the method further comprises:
   decrementing the largest stack number, resulting in a decremented stack number;
   determining one or more third series chains of transistors having the decremented stack number of transistors of the same type, wherein the one or more third series chains of transistors comprise the one or more first series chains of transistors and at least one of the one or more second series chains of transistors;
   creating a different modified standard cell by increasing the gate length of one or more of fourth series chains of transistors, wherein each of the one or more fourth series chains of transistors has a lesser number of transistors than any one of the one or more third series chains of transistors; and
   adding the different modified standard cell to the standard cell library in response to determining that the different modified standard cell meets the one or more design requirements.

4. The method of claim 3 wherein at least one of the one or more design requirements that the modified standard cell does not meet is selected from the group consisting of an area design requirement, a timing requirement and a leakage requirement.

5. The method of claim 1 wherein:
   a leakage current of the modified standard cell is less than a leakage current of the standard cell; and
   a footprint area of the modified standard cell is a same size as a footprint area of the standard cell.

6. The method of claim 1 wherein:
   a leakage current of the modified standard cell is less than a leakage current of the standard cell and more than a leakage current of a low leakage standard cell, wherein the low leakage standard cell comprises a plurality of upsized transistors cells each having an increased gate length; and
   a footprint area of the modified standard cell is larger than a footprint area of the standard cell and less than a footprint area of the low leakage standard cell.

7. The method of claim 1 wherein:
   a leakage current of the modified standard cell is less than a leakage current of the standard cell and more than a leakage current of a low leakage standard cell, wherein the low leakage standard cell comprises a plurality of upsized transistors cells each having an increased gate length; and
   a footprint area of the modified standard cell is a same size as a footprint area of the low leakage standard cell; and
   one or more timing specifications of the modified standard cell are faster than one or more corresponding timing specifications of the low leakage standard cell.

8. A system comprising:
   one or more processors;
   a memory accessible by the one or more processors;
   one or more subsystems utilizing at least one of the one or more processors and configured to:
      select one or more first series chains of transistors of a same type, wherein each of the one or more first series chains of transistors comprises a greater number of transistors than any of one or more second series chains of transistors, wherein the one or more first series chains of transistors and the one or more second series chains of transistors are included in a standard cell;
      create a modified standard cell from the standard cell by increasing a gate length of one or more of the second series chains of transistors;
      add the modified standard cell to a standard cell library in response to determining that the modified standard cell meets one or more design requirements;
      create an integrated circuit design utilizing at least one instance of the modified standard cell stored in the standard cell library; and
      generate mask layer data based upon the integrated circuit design, wherein the mask layer data is configured to generate a plurality of masks for construction of an integrated circuit corresponding to the integrated circuit design; and
      form a plurality of masks for construction of an integrated circuit corresponding to the integrated circuit design.

9. The system of claim 8 wherein the one or more subsystems are further configured to:
   determine a largest stack number of the standard cell, wherein the largest stack number is a largest amount of transistors of the same type that are connected in series in the standard cell; and
   perform the selecting of the one or more first series chains of transistors based upon the largest stack number, wherein each of the one or more first series chains of transistors comprises an amount of transistors equal to the largest stack number.

10. The system of claim 9 wherein, in response to determining that the modified standard cell does not meet at least one of the one or more design requirements, the one or more subsystems are further configured to:
    decrement the largest stack number, resulting in a decremented stack number;
    determine one or more third series chains of transistors having the decremented stack number of transistors of the same type, wherein the one or more third series chains of transistors comprise the one or more first series chains of transistors and at least one of the one or more second series chains of transistors;
    create a different modified standard cell by increasing the gate length of one or more of fourth series chains of transistors, wherein each of the one or more fourth series chains of transistors has a lesser number of transistors than any one of the one or more third series chains of transistors; and
    add the different modified standard cell to the standard cell library in response to determining that the different modified standard cell meets the one or more design requirements.

* * * * *